(12) United States Patent
Suhm et al.

(10) Patent No.: US 8,662,203 B2
(45) Date of Patent: Mar. 4, 2014

(54) METHOD AND DEVICE FOR CREATING A DEEP BOREHOLE

(75) Inventors: Werner Suhm, Gengenbach (DE); Jurgen Binder, Lahr-Suiz (DE); Martin Ruder, Gengenbach (DE); Michael Back, Offenberg (DE)

(73) Assignee: Herrenknecht Vertical GmbH, Schwanau (DE)

( * ) Notice: Subject to any disclaimer, the term of this patent is extended or adjusted under 35 U.S.C. 154(b) by 542 days.

(21) Appl. No.: 12/735,564

(22) PCT Filed: Jan. 26, 2009

(86) PCT No.: PCT/EP2009/000485
§ 371 (c)(1),
(2), (4) Date: Mar. 31, 2011

(87) PCT Pub. No.: WO2009/095195
PCT Pub. Date: Aug. 6, 2009

(65) Prior Publication Data
US 2011/0220413 A1    Sep. 15, 2011

(30) Foreign Application Priority Data
Jan. 28, 2008  (DE) .......................... 10 2008 006 392

(51) Int. Cl.
*E21B 7/00*     (2006.01)
*E21B 19/00*    (2006.01)

(52) U.S. Cl.
USPC .............................................. 175/57; 175/85

(58) Field of Classification Search
USPC ............................................. 175/57, 219, 85
See application file for complete search history.

(56) References Cited

U.S. PATENT DOCUMENTS

| | | | | | |
|---|---|---|---|---|---|
| 2,331,072 | A | * | 10/1943 | Hansen et al. ..................... | 299/2 |
| 2,872,933 | A | * | 2/1959 | Mackey ......................... | 52/2.17 |
| 3,626,836 | A | * | 12/1971 | Schneidler ..................... | 454/339 |
| 3,866,697 | A | * | 2/1975 | Rossfelder et al. ............... | 175/5 |
| 4,108,255 | A | * | 8/1978 | Smith ............................... | 175/9 |

* cited by examiner

*Primary Examiner* — Daniel P Stephenson
(74) *Attorney, Agent, or Firm* — Mark Rodgers

(57) ABSTRACT

The invention relates to a method for creating a deep borehole, in particular in an emission-sensitive region, and to a device therefor. The invention is based on the object of providing a drilling method and a drilling device allowing deep boreholes to be created even in regions which are sensitive to emissions, such as inner-city buildings or in nature regions to be protected, and at the same time of reducing significant damage to these regions when creating deep boreholes. This object is achieved in that a shaft structure (20) is created, a stationary drilling system (10) is installed into the shaft structure (20), the floor (23) of the shaft structure is prepared as a drilling starting point and the deep borehole is sunk using a suitable drilling method.

11 Claims, 6 Drawing Sheets

METHOD AND DEVICE FOR CREATING A DEEP BOREHOLE

The invention relates to a method for creating a deep borehole, in particular in an emission-sensitive region, and to a device therefor.

Deep boreholes have been produced for decades for exploring crude oil and natural gas deposits down to depths of greater than 5,000 m.

The sinking of a deep borehole requires a drilling site of considerable size at the surface around the drilling location. In addition to the drilling system itself, the energy supply, the units necessary for providing and pumping over the drilling fluid, coops, recreation rooms and management facilities and also a store for the drill rods and other operating means are necessary there. For safety reasons and for emission protection reasons, a considerable distance from any surrounding residential buildings is also necessary.

More recently, deep boreholes have also been executed to tap and utilize geothermal heat. In this case, either underground aquifers are tapped and the hot water is conveyed directly or the water is guided and heated up in what are known as open systems with a feed borehole and a production borehole through the earth positioned therebetween as a heat exchanger before it is conveyed. The conveyed water, usually in the form of water vapor, is then passed through turbines to produce power.

The second form of use is the direct utilization of heat in the form of district heat. In this case in particular, proximity to the consumer is crucial for the efficiency and the effectiveness of the district heating on account of losses during transportation. However, the production of deep boreholes of this type close to consumers or even in an inner-city location is for various reasons, including those mentioned hereinbefore, not without problems. On the one hand, ongoing drilling operation has significant repercussions, such as noise, dirt and construction site operation, on the environment in general (emission protection). On the other hand, precisely in an inner-city location, particular safety precautions have to be taken on account of the hazardous location when creating deep boreholes and it is necessary to maintain distances from the surrounding buildings that would require very large construction site installation areas which often cannot be achieved.

Furthermore, deposits to be tapped are often located in regions of particularly sensitive nature or nature to be protected, for example regions near river banks/mud flats, particularly emission-sensitive fauna, etc. The sinking of a deep borehole is frequently ruled out on account of the aforementioned repercussions. The term "deposits" refers in particular to deposits of hydrocarbons, gases, storage repositories for gases, liquids or other liquid products, gases or any type of waste to be brought into pores and/or crevices.

The invention is based on the object of providing a drilling method and a drilling device allowing deep boreholes to be created even in regions which are sensitive to emissions, such as inner-city buildings or in nature regions to be protected, and at the same time of reducing significant damage to these regions when creating deep boreholes.

With regard to the method, this object is achieved in that a shaft structure is created, a stationary drilling system is installed into the shaft structure, the floor of the shaft structure is prepared as a drilling starting point, and the deep borehole is sunk using a suitable drilling method.

The method according to the invention causes the emissions with regard to noise, etc. to be minimized as a result of the arranging of the drilling system in the shaft structure. By partly or completely accommodating the drill tower in the shaft, the safety distances from the adjacent buildings can be greatly reduced. Toppling of the drill tower onto the adjacent buildings is prevented on the one hand by the wall of the shaft and on the other hand by the anchoring of the drill tower to the wall of the shaft. External influences produced by wind forces acting on the drill tower are minimized in this way. The fact that the drilling technology is accommodated in the shaft further reduces the emissions of noise and dirt on the construction site area and improves the visual appearance of the construction site, as it is merely necessary to transport materials to and remove materials from the surface. All the basic drilling activities are performed in the shaft. From an environmental perspective, erecting the deep drilling technology in the shaft has particular advantages. Issuing liquids during the drilling process are not distributed in the conventional manner on the drilling site, but are directly collected in the shaft. The internally and externally tight shaft acts in this case like an oil sump which prevents soiling of the earth and groundwater. Furthermore, as a result of the fact that the drilling technology is erected in the shaft, the drilling technology, which is optimized in terms of noise emission anyway, allows an even quieter drilling operation. This is crucial for the acceptance of the drilling and construction work, particularly in or near densely populated areas and in proximity to consumers.

The further configurations of the invention mentioned hereinafter relate both to the device according to the invention and to the method according to the invention.

Furthermore, the object according to the invention is achieved by a drilling device, in particular for carrying out the method described hereinbefore, with a shaft structure and a stationary drilling system arranged in the shaft structure.

The device according to the invention gives rise, in addition to the advantages mentioned hereinbefore, to new possibilities of drill tower design and drilling sequence automation as a result of the possibility of jointly using the walls of the shaft as a load-bearing structure, for anchoring or support. It becomes possible to reduce the size of and slim down the drill tower technology in order to save costs. In addition, additional automation of the drilling sequence ensures a reduction in the number of drilling staff in the shaft and thus in the hazardous zone.

An advantageous teaching of the invention makes provision for the shaft structure to be produced using an automatic shaft sinking machine, by mining using a drilling and blasting method and/or by means of freezing shaft methods.

Furthermore, it is advantageous for the depth of the shaft structure to be 15 to 100 m, preferably 30 to 50 m. A further advantageous teaching of the invention makes provision for the diameter of the shaft structure to be up to 20 m, preferably up to 15 m. In this way, it is possible to provide a shaft structure allowing the necessary dimensions to completely receive a drilling system.

Furthermore, it is advantageous for an energy supply of the drilling system to be arranged in the shaft structure. A further advantageous teaching of the invention makes provision for auxiliary units, in particular tanks, pumps and/or processing devices for providing a drilling fluid, to be arranged in the shaft structure. As a result, emissions at the surface are reduced. Furthermore, the area taken up by the drilling site itself is reduced.

Furthermore, it is advantageous for the drilling system to be fastened to at least one wall of the shaft structure. The forces acting on the drill tower are reduced as a result of the anchoring of the drill tower to the wall of the shaft, so that the drill tower may be lighter in its design. The tower of the system can be embodied more easily with regard to static concerns. Furthermore, deformations during drilling are reduced.

A further advantageous teaching of the invention makes provision for a drill rod assembly store to be arranged in the shaft structure, preferably perpendicularly on a wall of the shaft structure. In this way, the amount of space required is minimized and the accessibility of the drill rod assembly is optimized. Furthermore, this is also advantageous for further automation of the drilling system, as it allows the drilling sequence to be sped up when resetting the drill rod assembly or when dismantling and installing the drill rod assembly when exchanging the drilling tool. Depositing the drill rod assembly perpendicularly along the wall of the shaft in an automatically supplying rod assembly magazine and an automatic pipe handler would allow the resetting of the drill rod assembly to be largely automated. In a conventional construction of the drilling technology at the surface, an implementation of this type would require comprehensive additional design, assembly and holding possibilities. The consequences would be, in addition to soaring costs for the drilling technology, also a major increase in the space required on the construction site; this is problematical, particularly in proximity to consumers or close to or in densely populated areas.

Furthermore, it is advantageous for the shaft structure to be covered. Completely covering the shaft allows minimal intervention at the surface by the drilling work and the building operation to be uncoupled from the surface. Furthermore, persons working on the drill tower are exposed to minimal weather influences (cold, rain) as a result of the possibility of covering the shaft. Furthermore, completely covering the shaft structure also serves to keep the shaft dry during precipitation and thus to reduce waste waters in building and drilling operation.

A further advantageous teaching of the invention makes provision for the depth of the shaft structure to be designed in such a way that the entire height of the drilling system is located in the shaft structure. Toppling of the drill tower onto the adjacent buildings is prevented on the one hand by the wall of the shaft and on the other hand by the anchoring of the drill tower to the wall of the shaft. External influences produced by wind forces acting on the drill tower are minimized in this way. A more compact design of the drilling system is allowed and the required depth of the shaft is reduced as a result of the provision of shorter cylinders in a hydraulic lifting mechanism of the drilling system, as a result of shorter strokes and/or the use of individual rod assemblies as the drill rod assembly.

Furthermore, it is advantageous for the shaft structure to be connected to at least one underground further structure, in particular a road, a drift and/or a borehole. On connection of the shaft to an underground structure of this type, the underground structure can be jointly utilized in the building phase as a construction site installation location and basic components of the construction site installation are placed there. Depending on the diameter of the tunnel, it is for example possible to accommodate there also separating means, rod assembly stores, secondary units and/or the energy supply for the drilling work. A further advantageous teaching of the invention makes provision for the shaft structure to be connected in its floor region to the surface. This allows adequate ventilation. Furthermore, it is advantageous for the shaft structure to be actively ventilated. When the shaft structure is linked to an underground structure, the shaft structure can be used, if there is a connection to the surface, for supplying fresh air, thus allowing active ventilation. This is advantageous particularly when the shaft is completely covered in order to ensure in the case of blowouts discharge conditions as when the system is erected at the surface. In addition to the advantages mentioned hereinbefore, if the shaft structure is linked to an underground tunnel, the tunnel can jointly be utilized, depending on its diameter, to deliver and remove materials and automation of the entire drilling sequence can be further increased. In addition, the space at the surface is restricted less by transporting and removing. Furthermore, it is advantageous for the shaft structure to be connected in its floor region to the surface. A further advantageous teaching of the invention makes provision for a ventilation to be provided.

When the shaft structure is linked to an underground tunnel and the shaft structure is completely covered, building and drilling work is demarcated from the surface and noise, dirt, etc. pollution is minimized.

A further advantageous teaching of the invention makes provision for a depression, into which a blowout preventer is installed, to be created by the floor of the shaft structure in the region of a borehole starting point. The sinking of blowout preventers in the floor of the shaft allows the required depth of the shaft to be greatly reduced for this purpose.

Substructures on which the drill tower is conventionally arranged can be placed close to the shaft on the surface. Shorter cylinders, shorter strokes and the use of individual rod assemblies allow an even more compact design and reduce the required depth of the shaft.

Furthermore, it is advantageous for working platforms to be erected in the shaft structure. The possibility of arranging working platforms on the drill tower creates additional working areas and furthermore working on the tower becomes safer and more practical as a result of the possibility of depositing tools, etc. Furthermore, the possibility of arranging various working platforms can allow an improved safety distance of staff from the drilling events, depending on the degree of automation of the drilling system.

The advantages of including a shaft structure in the creation of deep boreholes exist not only during the advancement of the drill, i.e. in the building phase, but also in the utilization phase after completion of the borehole. The shaft structure can be utilized here to accommodate apparatus technology, pumps, units and any turbines. This has advantages for the area required for supply means of this type at the surface. A smaller area is taken up here.

In addition, accommodating the technology in the shaft increases the protection of the technology from unauthorized accessing, sabotage or else wanton damage (terrorist attacks). As a result, the supply safety is increased.

If the shaft structure is linked to an underground tunnel, the tunnel can be further used both in the building phase as described hereinbefore but also after the drilling work has been completed. Apparatus technology can be placed here in addition to the shaft structure. Furthermore, the conveyed media can be supplied and forwarded directly to underground distribution systems (pipelines). Direct access of unauthorized parties to the shaft, apparatus technology and pipelines can be monitored in this way.

Instead of a drill rod assembly, the use of coil tubing is also conceivable. For this purpose, the drill string, which is wound onto drums, can be suspended in the shaft structure in an optimum offset from the drilling starting point, so that as few deflections as possible are produced during unwinding from the drums. The lifting mechanism used for the drilling system may be a hydraulic system with lifting cylinders. Alternatively or else additionally for particular cases, use may also be made of a rope lifting mechanism which may be suspended separately from the tower of the drilling system at the top of the shaft. Furthermore, a casing drilling method can also be directly used. It is also possible to use drilling or production pipe strings prepared in the shaft or in the road if for example particular requirements are demanded of the tightness of the string in specific stratum layers, for example drinking water layers or the like.

After completion of the drilling work, the shaft structure can also be used as a space for erecting a geothermal power station or the like. The same applies to direct processing systems for producing oil or gas.

A further teaching of the invention makes provision for the shaft structure to be prepared with a plurality of drilling portions into which the drilling system for sinking a further borehole is successively installed in each case once the preceding borehole has been completely sunk. The number of drilling starting points is varied in accordance with the diameter of the shaft and the available floor area. Each position is for example provided with a drilling starting point, a depression for a blowout preventer in the floor of the shaft and/or with a receptacle and/or a recess on the wall of the shaft for attaching a drilling system, the guides of the drilling system being arranged in an advantageous manner on the receptacle and/or in the recess. Once a borehole has been sunk, the drilling system is dismantled and reconstructed at the next drilling starting point. This allows optimum utilization of the shaft structure for sinking the boreholes and allows rapid and continuous drilling operation; this can keep down in particular provision times of drilling systems. As an alternative, these elements can also each be prepared before the sinking of the next borehole in the shaft and then be connected to the drilling system.

Furthermore, it is advantageously possible to sink boreholes diverted from each drilling starting point. In this case, the boreholes can be diverted in any desired direction both vertically and horizontally in order to be able to tap in environmentally sensitive regions an underground reservoir which is as large as possible with minimal surface intervention.

The invention will be described hereinafter in greater detail based on an exemplary embodiment and with reference to the drawings, in which.

Figure 1:
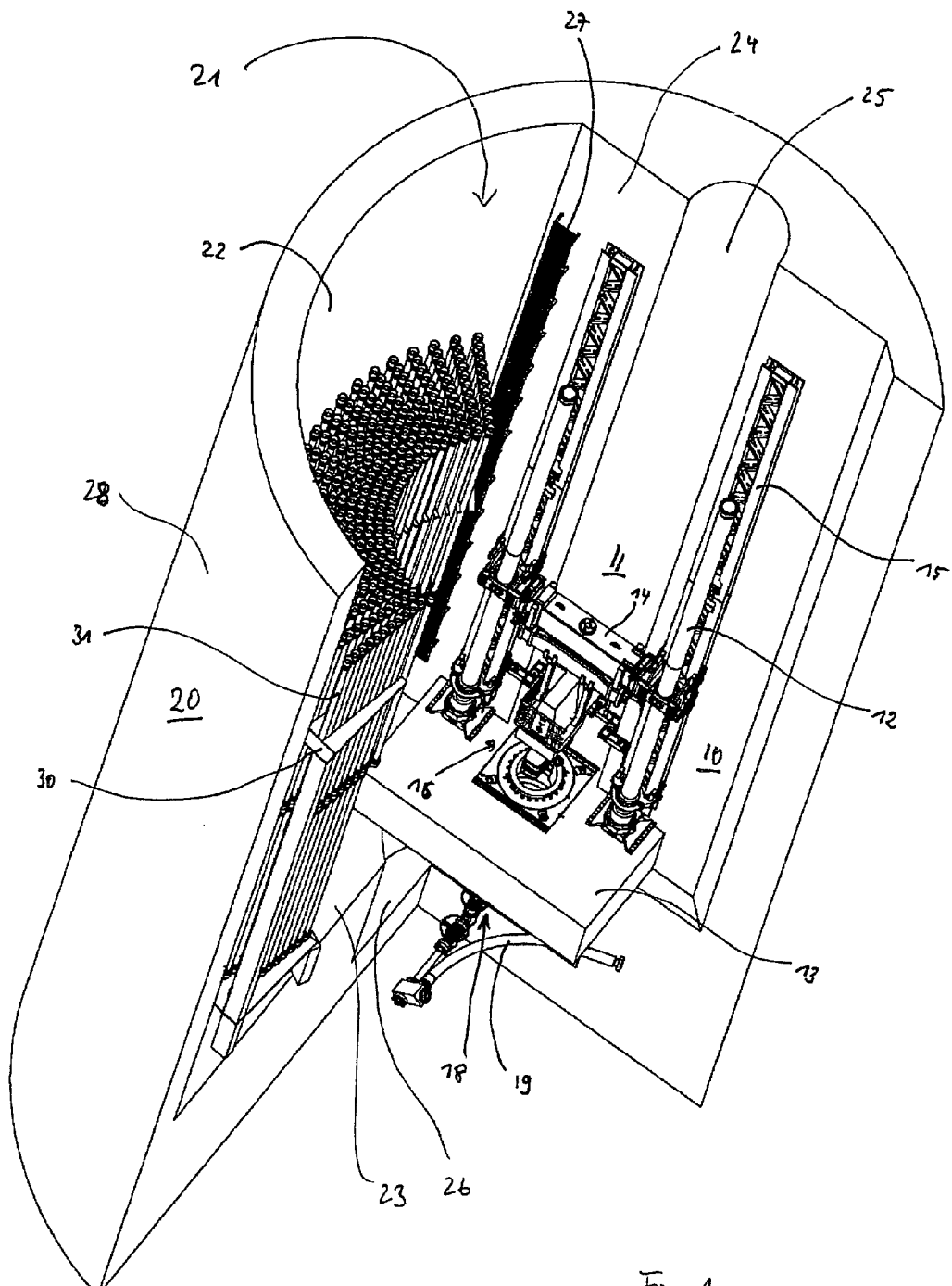
FIG. 1 is a spatial view of the device according to the invention.
Figure 5:
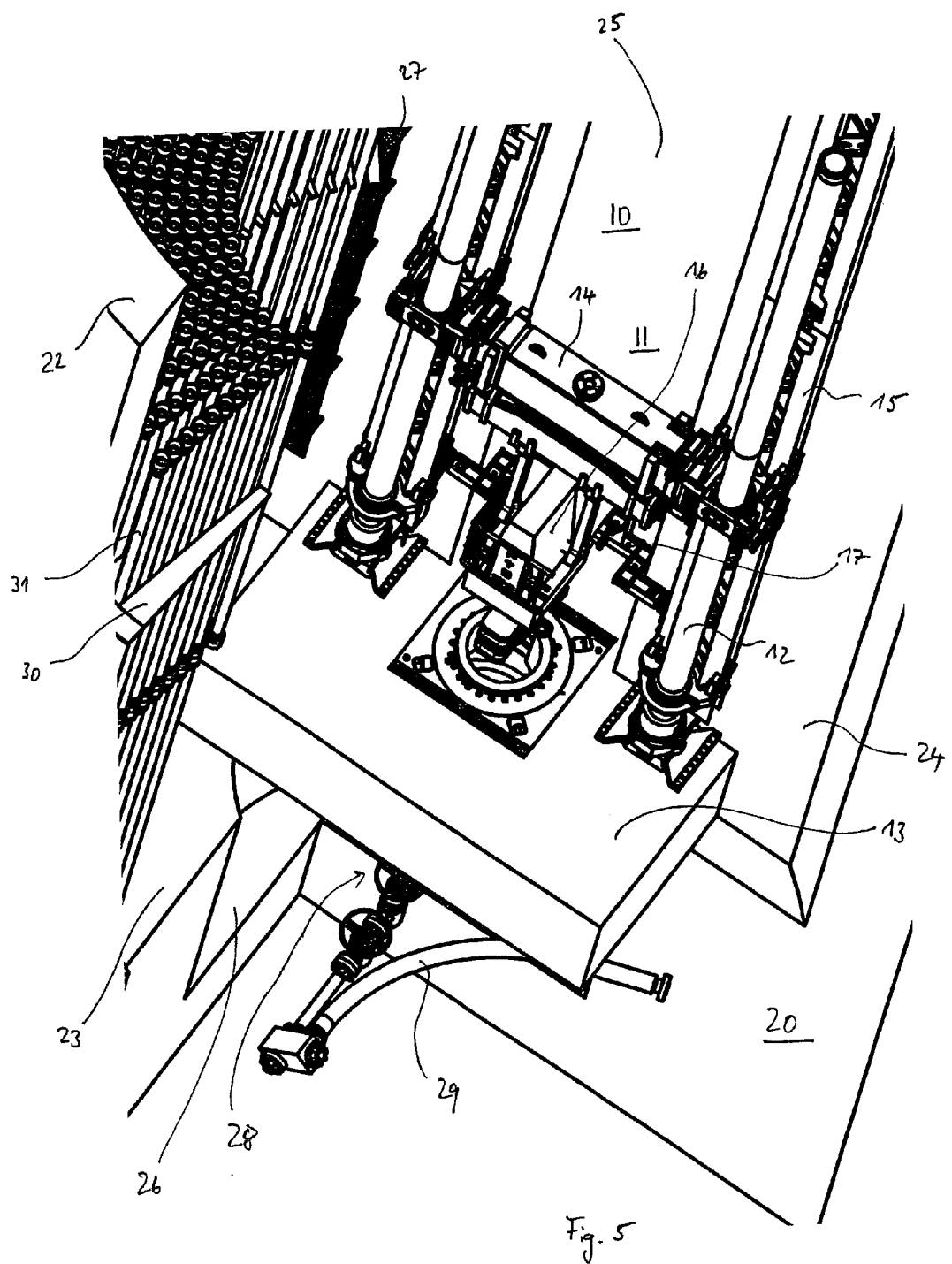
FIG. 5 is a detail-type view in relation to FIG. 1.

FIG. 1 and FIG. 5 show a drilling device 10 according to the invention arranged in a shaft structure 20. The drilling device 10 has a hydraulic lifting mechanism 11 in which lifting cylinders 12 stand on a base plate 13. A carrier beam 14, which is vertically guided on guides 15, is provided as a connecting element between the lifting cylinders 12. The carrier beam 14 is securely connected to the lifting cylinders 12 and is moved vertically in the shaft structure 20 by means of the lifting cylinders. A top drive 16 for rotating the drill string (not shown) is movably arranged on the carrier beam 14. The top drive 16 is provided with a pivoting mechanism 17 via which the top drive 16 can be pivoted for receiving new drill rods 31. A rotary table for intercepting the drill string is provided in the base plate 13, the rotary table holding the drill string in the case of the installation or dismantling of the drill string when the drill string is not suspended from the lifting mechanism 11.

Figure 3:
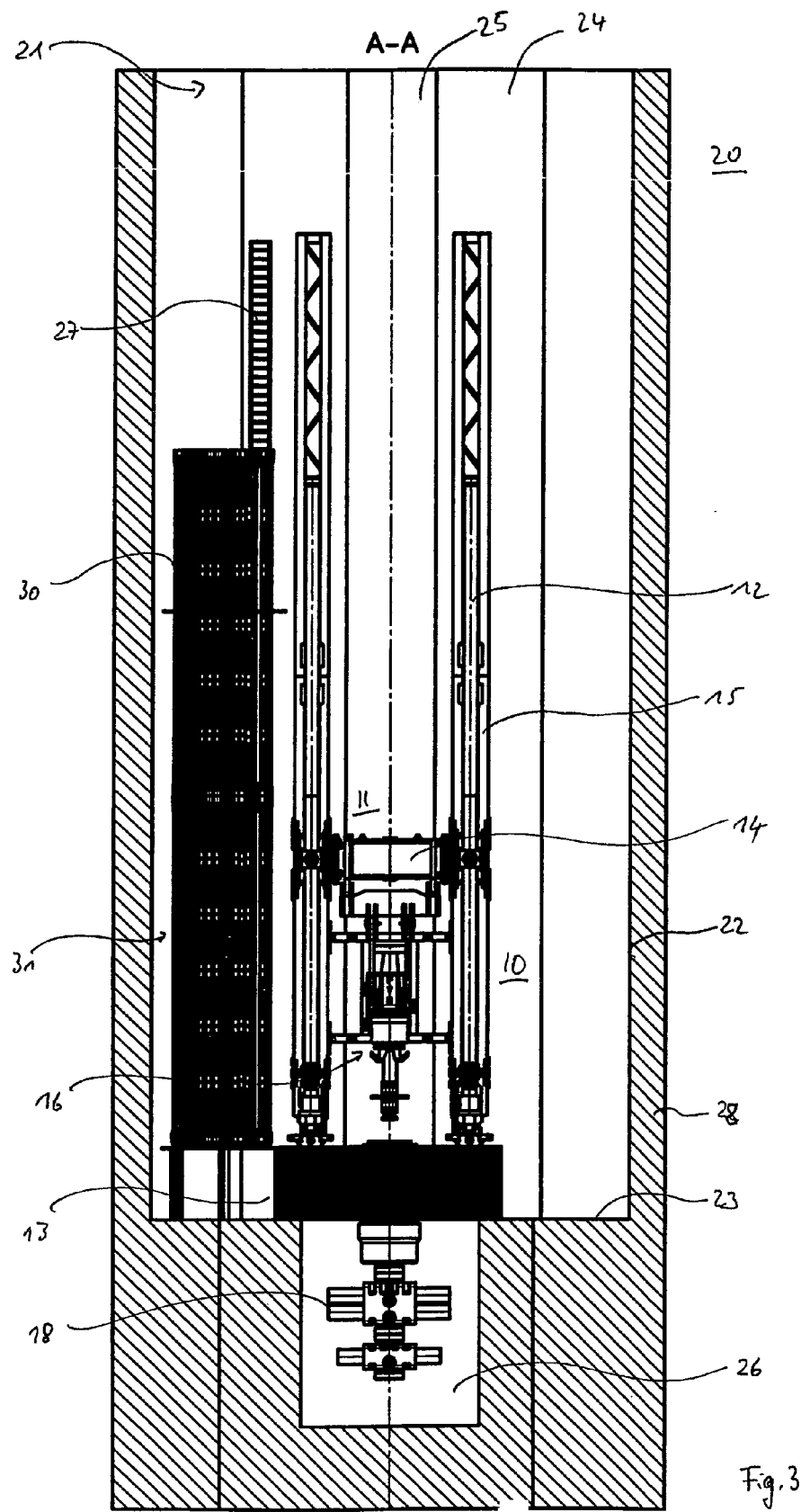
FIG. 3 is a sectional view taken along the line A-A from FIG. 2.
Figure 4:
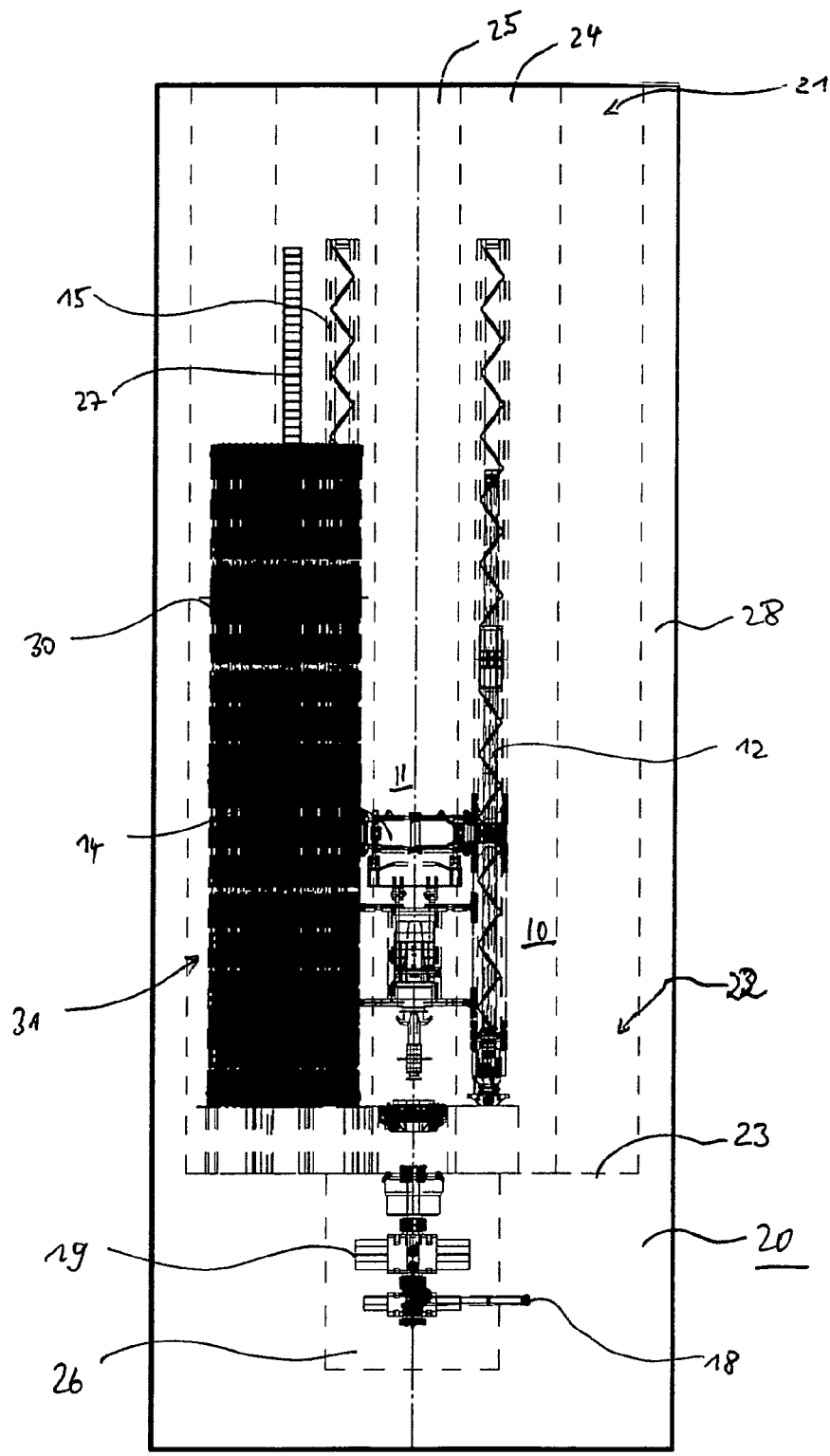
FIG. 4 is a side view with a transparent shaft structure in relation to FIG. 1.

The shaft structure 20 has an annular cross section 21 (other cross sections, for example rectangular, ellipsoidal or the like are also possible), which is defined by walls 22 of the shaft, and is delimited at its underside by the floor 23 of the shaft. The walls of the shaft are provided with a lagging 28, for example tubbings. A receptacle 24 is arranged on the wall 22 of the shaft, the drilling device 10 being arranged on the receptacle. The receptacle 24 has at its center a recess 25 into which the drilling device 10 protrudes with a pivoting mechanism 17 for the top drive and can move vertically. A depression 26, on the floor of which the drilling starting point (not shown) is located and in which a blowout preventer 18 of the drilling system 10 is arranged (see FIG. 3 and FIG. 4), is arranged on the floor 23 of the shaft. The blowout preventer 18 is connected by a connection 19 to the fluid circulation system (not shown) (see FIG. 1).

The guides 15 of the lifting mechanism 11 are arranged on the receptacle 24. In addition to the guides 15, a ladder 27 is provided as a means for repair and assistance travel.

Figure 2:
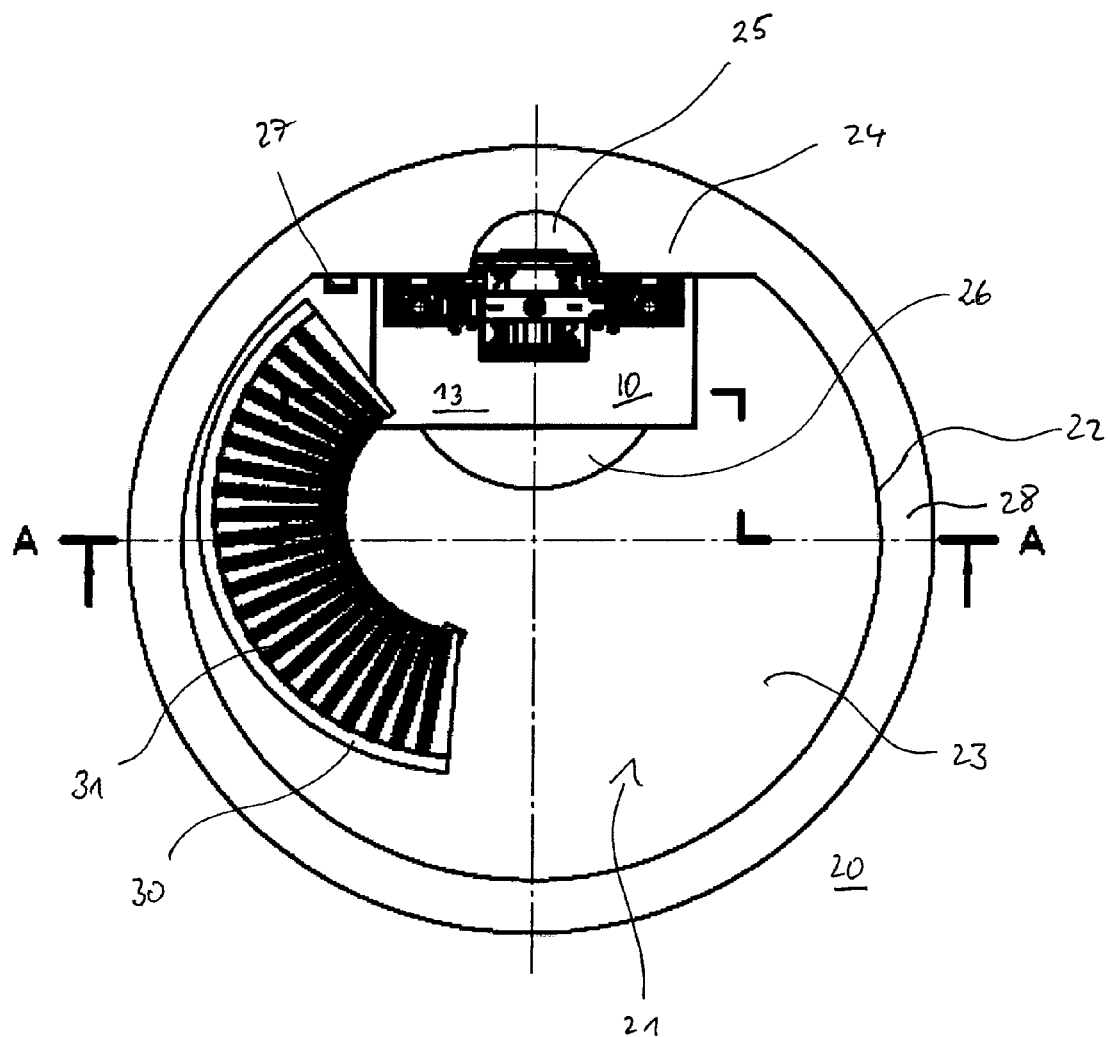
FIG. 2 is a plan view in relation to FIG. 1.

FIG. 2 is a plan view in relation to FIG. 1. Arranged at the left-hand side of the shaft 20 is a drill rod magazine 30 in which the drill rods 31 are set down, either as a store for further installation when the borehole has been sunk by the length of a drill rod 31 or as an intermediate store during installation and dismantling of the drill rods 31 in order to carry out a drilling tool exchange.

Figure 6:
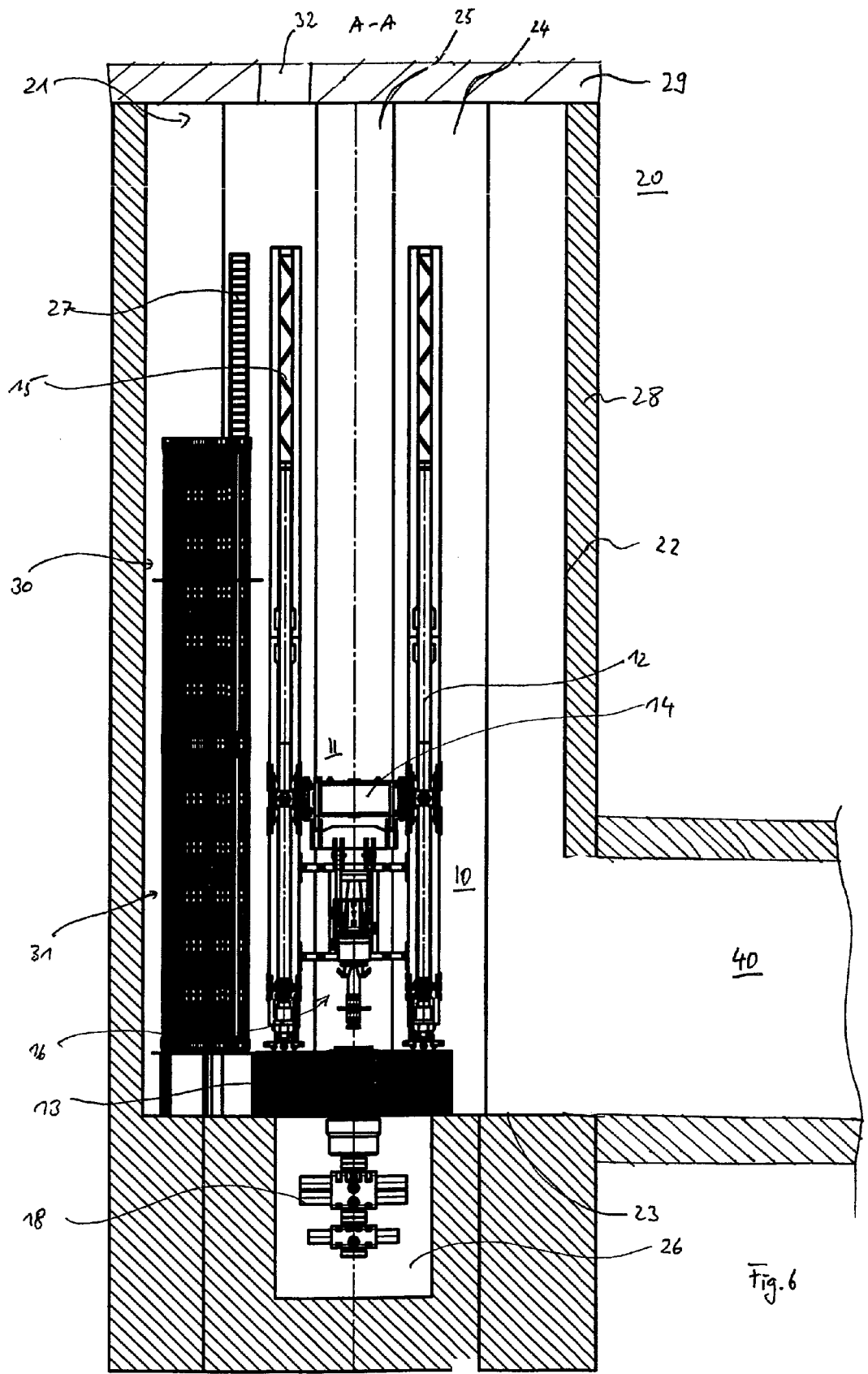
FIG. 6 is a sectional view of a further embodiment according to the invention.

FIG. 6 shows a further embodiment according to the invention. In this case, the shaft structure 20 is connected in the region of its floor 23 to a road 40 which can be designed as a blind road or has a connection to the surface. The shaft structure 20 is provided at its upper opening with a cover 29 having openings 32 for ventilating the shaft structure 20. In this way, the release of emissions from the shaft, such as noise or waste gases, is reduced. The shape of the cover can also be designed in a dome-like manner or the like. The energy supply, further stores for drill rods and also the auxiliary units such as pumps and tanks for the fluid, and also the means for processing the drilling fluid can be arranged in the road 40. Furthermore, if the road 40 is also suitable for travel, the transportation of material for the drilling system can be carried out via the road 40. Furthermore, the ventilation of the drilling system can also be carried out via the road 40. The drilling system 10 is arranged completely in the shaft structure 20. The depth of the shaft is thus dependent on how long a pipe portion of the drill string is. If the drill rods 31 are to be introduced individually, then the shaft may be shorter, although the times for exchanging a drilling tool are longer, as each drill rod 31 has to be dismantled individually. The drill rods 31 can also be provided as double or triple portions. If no cover 29 is to be provided, then it is also possible to have the guides 15 of the drilling system 10 protrude beyond the shaft structure 20. Covering can then be carried out through an aboveground structure, like an encasing of a shaft in conventional mining.

In an alternative embodiment (not shown) of the invention, the shaft structure 20 is prepared with a plurality of drilling positions into which the drilling system 10 can be installed in each case once a borehole has been fully sunk. In addition, depending on the diameter of the shaft and the available area of the floor of the shaft, the number of drilling starting points can also be varied. Each position is for example provided with a drilling starting point, a depression 26 for a blowout preventer 18 and with a receptacle 24 and a recess 25 for attaching a drilling system 10, the guides 15 of the drilling system 10 being arranged on the receptacle 24 and in the recess 25. Alternatively, these elements 24, 25, 26 can also each be prepared before the next borehole is sunk and then be connected to the drilling system 10. Once a borehole has been sunk, the drilling system 10 is dismantled and reconstructed at the next drilling starting point.

Furthermore, the shaft structure 20 can also be linked underground to supply and disposal lines. These can be created by microtunnelling. Further possibilities for creating methods are horizontal directional drilling (HDD) or else direct pipeline laying. These lines may later also be used as conveying pipelines for removing raw materials or the heat transfer medium. The roads 40 can be drifted using tunnel drilling machines or by mining using drilling and blasting methods, depending on the subsoil or on economy with regard to the length of the road. Possible laggings include segmental linings. It is thus possible to create, particularly in near coastal regions or in mud flats, water-independent accesses to the boreholes which at the same time display high protection from environmental pollution, in particular in oil and gas production. A high degree of protection is also provided from weather influences and weather extremes such as storms and the like.

During the production time of the borehole, the shaft structure 20 can easily be closed with a cover 29. Access to the borehole thus remains possible. A high degree of safety is in this way generated for the borehole in relation to third parties. The environment is also protected from damage during the production time on account of the shaft structure. Furthermore, it is possible to completely retreat and to refill the shaft structure 20 after completion of the production time.

LIST OF REFERENCE NUMERALS

10 drilling system
11 lifting mechanism
12 lifting cylinder
13 base plate
14 carrier beam
15 guide
16 top drive
17 pivoting mechanism
18 blowout preventer
19 connection, fluid circulation system
20 shaft structure
21 cross section of the shaft
22 wall of the shaft
23 floor of the shaft
24 receptacle
25 recess
26 depression
27 ladder
28 lagging
29 cover
30 drill rod magazine
31 drill rod
32 opening
40 road

The invention claimed is:

1. A method for creating a deep borehole in an emission-sensitive region on shore, including the steps:
   creating a shaft structure;
   installing a stationary drilling system into the shaft structure;
   preparing a floor of the shaft structure as a drilling starting point, wherein a tower of the drilling system is fastened to at least one wall of the shaft structure and a drill rod assembly store is arranged in the shaft structure perpendicularly on a wall of the shaft structure;
   sinking the deep borehole using a suitable drilling method.

2. The method as claimed in claim 1, characterized in that the shaft structure is produced using at least one of an automatic shaft sinking machine, by mining using a drilling and blasting method and by means of freezing shaft methods.

3. The method as claimed in claim 1, characterized in that the depth of the shaft structure is 15 to 100 m, preferably 30 to 50 m and that the diameter of the shaft structure is up to 20 m, preferably up to 15 m.

4. The method as claimed in claim 1, characterized in that an energy supply of the drilling system is arranged in the shaft structure and that auxiliary units, in particular tanks, pumps and processing devices for providing a drilling fluid, are arranged in the shaft structure.

5. The method as claimed in claim 1, characterized in that the shaft structure is covered.

6. The method as claimed in claim 1, characterized in that the depth of the shaft structure is designed in such a way that the entire height of the drilling system is located in the shaft structure.

7. The method as claimed in claim 1, characterized in that the shaft structure is connected to at least one underground further structure, in particular at least one of a road, a drift and a borehole.

8. The method as claimed in claim 7, characterized in that the supply with material, energy and fresh air is at least partly carried out via the further underground structure during the drilling operation.

9. The method as claimed in claim 1, characterized in that the shaft structure is connected in its floor region to the surface of the ground.

10. The method as claimed in claim 1, characterized in that a depression, into which a blowout preventer is installed, is created by the floor of the shaft structure in the region of a borehole starting point.

11. The method as claimed in claim 1, characterized in that working platforms are erected in the shaft structure.

\* \* \* \* \*